US012593220B2

(12) United States Patent
Desai et al.

(10) Patent No.: US 12,593,220 B2
(45) Date of Patent: Mar. 31, 2026

(54) APPARATUS, SYSTEM, AND METHOD USING DEVICE ECOSYSTEM AND ARTIFICIAL INTELLIGENCE ENHANCED

(71) Applicant: Cisco Technology, Inc., San Jose, CA (US)

(72) Inventors: Vishal S Desai, San Jose, CA (US); Young Il Choi, San Jose, CA (US); Jerome Henry, Pittsboro, NC (US); Shubham Pandey, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 365 days.

(21) Appl. No.: 18/311,120

(22) Filed: May 2, 2023

(65) Prior Publication Data

US 2024/0373247 A1 Nov. 7, 2024

(51) Int. Cl.
H04W 16/18 (2009.01)
H04B 17/318 (2015.01)
H04B 17/391 (2015.01)

(52) U.S. Cl.
CPC .......... H04W 16/18 (2013.01); H04B 17/328 (2023.05); H04B 17/3912 (2015.01); H04B 17/3913 (2015.01)

(58) Field of Classification Search
CPC ............... H04W 16/18; H04B 17/3912; H04B 17/3913; H04B 17/328
See application file for complete search history.

(56) References Cited

U.S. PATENT DOCUMENTS

| | | | |
|---|---|---|---|
| 10,820,263 B1 | 10/2020 | Barton et al. | |
| 2008/0032727 A1 | 2/2008 | Stephenson et al. | |
| 2011/0195707 A1 | 8/2011 | Faerber et al. | |
| 2013/0237231 A1 | 9/2013 | Nagaraja et al. | |
| 2014/0022919 A1* | 1/2014 | Dwivedi | H04W 36/0085 |
| | | | 370/252 |
| 2015/0327282 A1* | 11/2015 | Werner | H04W 72/542 |
| | | | 455/450 |
| 2016/0142967 A1 | 5/2016 | Lee | |
| 2017/0353868 A1 | 12/2017 | Montemurro et al. | |
| 2022/0330047 A1* | 10/2022 | Wang | H04W 28/0268 |

* cited by examiner

*Primary Examiner* — Natasha W Cosme
(74) *Attorney, Agent, or Firm* — Polsinelli P.C.

(57) ABSTRACT

A system and method are provided for determining, in a wireless network, true coverage holes and avoiding false positives. Between the use equipment (UEs) and the access points (APs), received signal strength indicator (RSSI) values are obtained for both the uplink (UL) path and downlink (DL) path. The UL RSSI and DL RSSI values are compared to a threshold (e.g., −80 dB), and a true coverage hole is identified when the UL RSSI and DL RSSI values are less than the threshold. False positives are identified when the UL RSSI values are less than the threshold, but the and DL RSSI values are not. The true coverage holes are mitigated by increasing the AP transmit power or by changing the locations and/or number of APs.

20 Claims, 9 Drawing Sheets

╭─ 300

DETERMINE UL RSSI AND DL RSSI FOR ACCESS POINTS AND USER EQUIPMENTS 302

COMPARE THE UL RSSI AND DL RSSI TO RESPECTIVE THRESHOLDS 304

DETERMINE A COVERAGE HOLE WHEN BOTH UL RSSI AND DL RSSI ARE BELOW THE THRESHOLDS 306

FOR DETECTED COVERAGE HOLES, MITIGATION OF THE COVERAGE HOLES IS PERFORMED 308

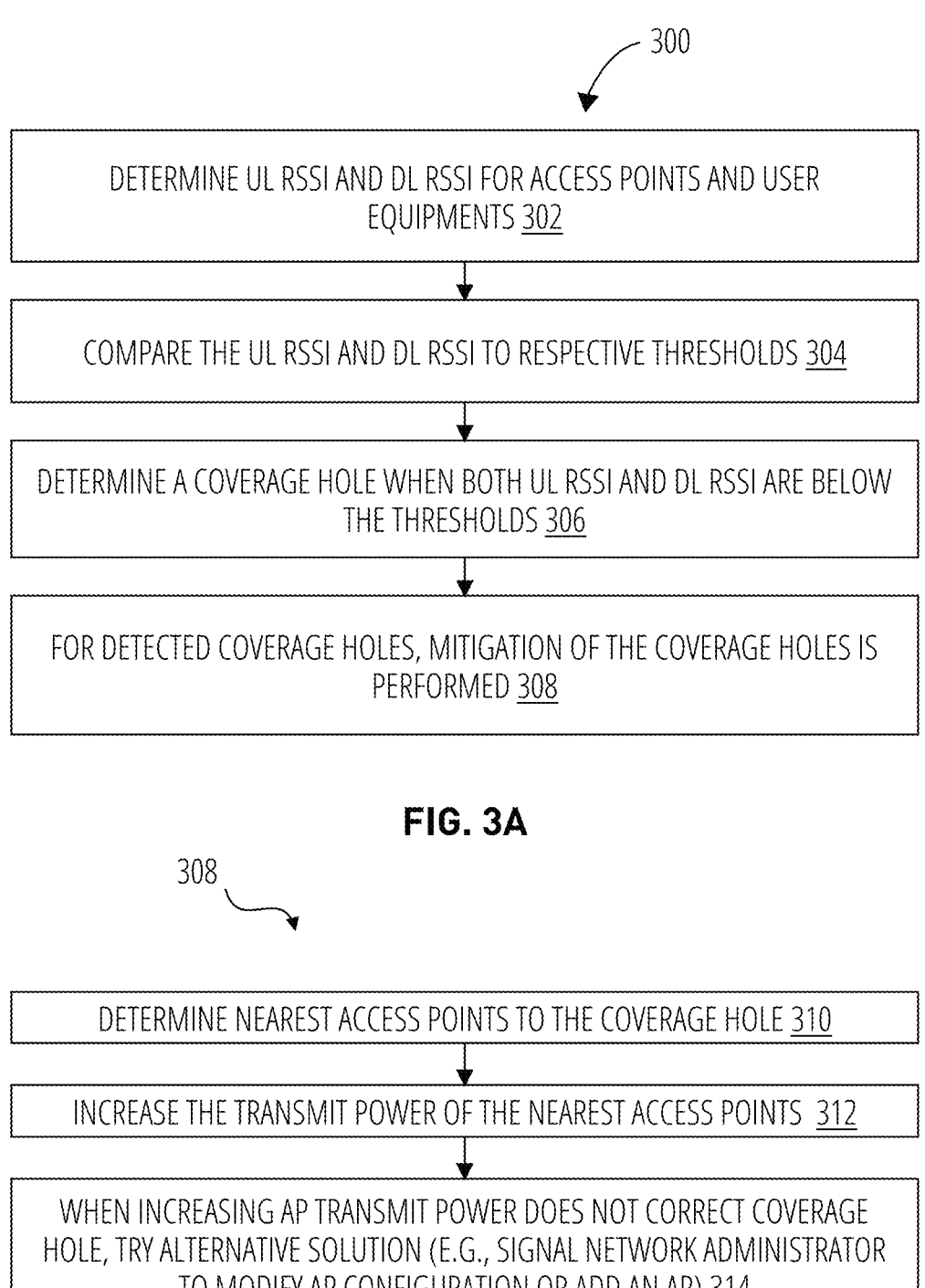

300

DETERMINE UL RSSI AND DL RSSI FOR ACCESS POINTS AND USER EQUIPMENTS 302

COMPARE THE UL RSSI AND DL RSSI TO RESPECTIVE THRESHOLDS 304

DETERMINE A COVERAGE HOLE WHEN BOTH UL RSSI AND DL RSSI ARE BELOW THE THRESHOLDS 306

FOR DETECTED COVERAGE HOLES, MITIGATION OF THE COVERAGE HOLES IS PERFORMED 308

DETERMINE NEAREST ACCESS POINTS TO THE COVERAGE HOLE 310

INCREASE THE TRANSMIT POWER OF THE NEAREST ACCESS POINTS 312

WHEN INCREASING AP TRANSMIT POWER DOES NOT CORRECT COVERAGE HOLE, TRY ALTERNATIVE SOLUTION (E.G., SIGNAL NETWORK ADMINISTRATOR TO MODIFY AP CONFIGURATION OR ADD AN AP) 314

FIG. 3B

UX REPRESENTATION

| Neighbor AP | Roaming Count | Client Association (Non-Roaming) | Average Client Count | Hidden Coverage Hole Detected (%) | RSSI | TxPower |
|---|---|---|---|---|---|---|
| AP1 | 21 | 2 | 18 | No (9%) | -70 | -6 dBm |
| AP2 | 3 | 21 | 15 | Yes (14%) | -80 | 3 dBm |
| AP3 | 9 | 4 | 20 | No () | -60 | -6 dBm |

FIG. 6

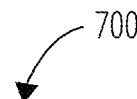

700

MONITOR THE ACTIVE USER EQUIPMENT, SELECT THOSE USER EQUIPMENT NEAR THE CELL EDGE, AND ACTIVATE TRIGGER FOR THE SELECTED UES TO ASSESS RF ENVIRONMENT 702

UPON TRIGGER ACTIVATION, THE AP SENDS REQUEST FOR REPORT(S) FROM SELECTED UES NEAR THE CELL EDGE 704

AP RECEIVES THE REPORT(S) FROM THE SELECTED UES 706

THE REPORT(S) IS PROCESSED TO DETERMINE WHETHER COVERAGE HOLE EVENT IS TRUE OR FALSE POSITVIE (E.G., PROCESSING IS PERFORMED BY THE AI CORE) 708

DETERMINE ADDITIONAL FALSE NEGATIVES FOR CASE WITH UL RSSI ABOVE THRESHOLD BUT DL RSSI BELOW THRESHOLD 710

FOR DETECTED COVERAGE HOLES, MITIGATION OF THE COVERAGE HOLES IS PERFORMED 308

FIG. 7

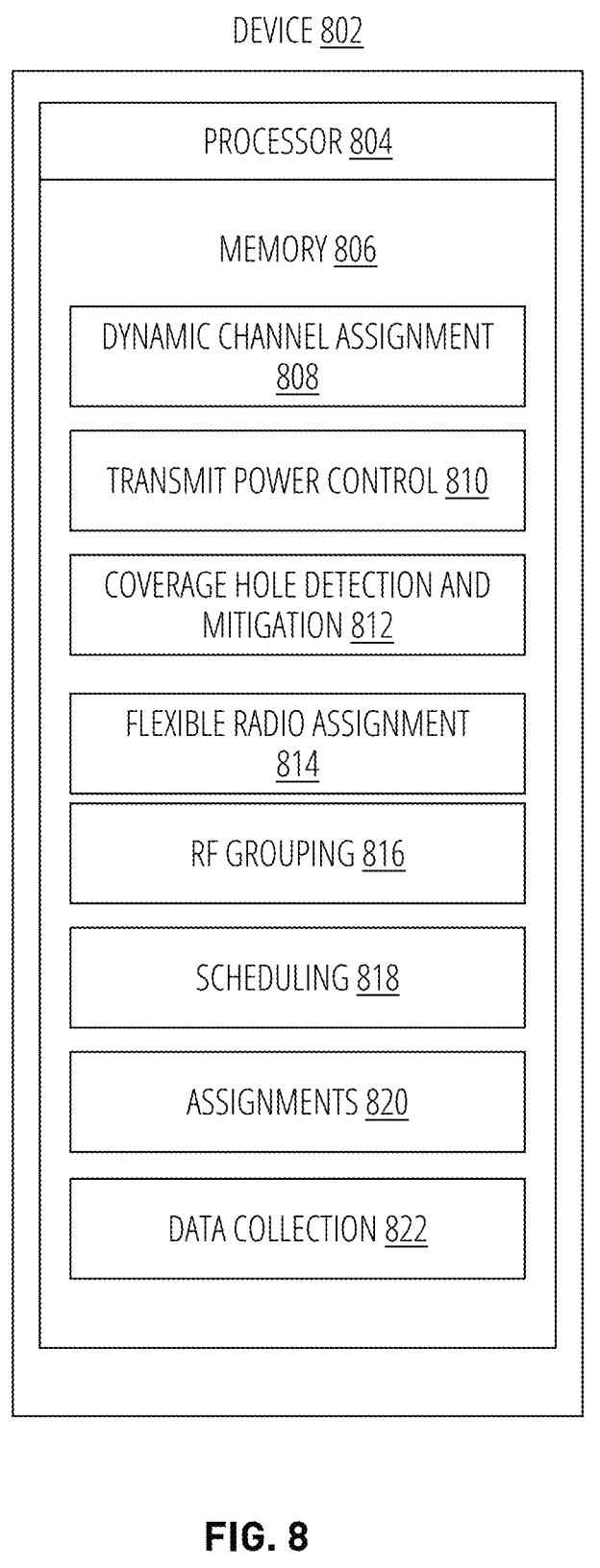

DEVICE 802

PROCESSOR 804

MEMORY 806

DYNAMIC CHANNEL ASSIGNMENT 808

TRANSMIT POWER CONTROL 810

COVERAGE HOLE DETECTION AND MITIGATION 812

FLEXIBLE RADIO ASSIGNMENT 814

RF GROUPING 816

SCHEDULING 818

ASSIGNMENTS 820

DATA COLLECTION 822

FIG. 8

APPARATUS, SYSTEM, AND METHOD USING DEVICE ECOSYSTEM AND ARTIFICIAL INTELLIGENCE ENHANCED

BACKGROUND

Wireless connectivity is quickly becoming ubiquitous in the modern world, and Wi-Fi is responsible for a significant part of this increase in wireless connectivity. Wi-Fi is one of the fastest growing wireless technologies of all time. With the proliferation of wireless devices and the growth of the internet of things (IoT), there is increasing demand for more bandwidth and wireless resources. Wireless spectrum is becoming even more precious than before, and the pressure on available spectrum seems likely to only increase over time. Because wireless spectrum is a limited commodity, there is increasing pressure to use the wireless spectrum efficiently.

Radio resource management (RRM) provides tools to better manage a wireless network. When two cells associated with access points (APs) of a wireless network overlap one another on the same channel, they share the spectrum normally reserved for each. In addition to the fact that users of each cell share the single channel of available spectrum, the spectrum is further constrained due to the doubling of the management traffic on the spectrum. This co-channel interference results in higher consumption of air time and less throughput. RRM attempts to improve the network performance by adjusting the channel plan to facilitate the maximum separation of one access point (AP) from another, and by adjusting the power levels transmitted by the APs to optimize the size of their effective cells to provide adequate coverage while minimizing conflicting overlaps. The RRM analyzes the existing RF environment, and adjusts each APs' power and channel configurations to help mitigate such things as co-channel interference and signal coverage problems. RRM reduces the need to perform exhaustive site surveys, increases system capacity and provides automated self-healing functionality to compensate for RF dead zones and AP failures.

As enterprises and other entities increasingly rely on wireless networks, monitoring and management of the components implementing the wireless network environments becomes more important. To ascertain the coverage and other performance attributes of a wireless network deployment, site sur-veys involving a human tester roaming throughout the wireless network environment with specialized equip-ment were previously used. Such site surveys, however, are time consuming and expensive. In addition, the analysis of the wireless network environment is performed with data gathered at a single point in time and, therefore, is not responsive to periodic or subsequent changes associated with the wire-less network environment.

Further, gaps or "holes" in the radio coverage of a wireless access point area can cause problems for WiFi users. The solution is to provide a coverage hole detection feature. Unfortunately, existing coverage hole detection implemen-tations suffer from false positive coverage hole alarms. Algorithms in the central wireless controllers may provide some coverage hole detection functions, but such algorithms do not provide features that eliminate false positive reports for coverage hole alarms. A response to a false positive may adversely affect the network by unnec-essarily increasing the transmitter power of one or more of the access points (APs) in the network, resulting in co-channel interference. Thus, it is important to eliminate false positive coverage hole detections.

In light of the foregoing, a need exists for methods, apparatuses, and systems that facilitate analysis of coverage in wireless network environments. A need further exists for methods, apparatuses, and systems that allow for analysis of coverage holes that is responsive to changing or varying conditions in wireless network environments and that avoid false positives for the detected coverage holes.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3A illustrates a flow diagram of an example of a method 300 for identifying coverage holes, in accordance with some embodiments.

FIG. 3B illustrates a flow diagram of an example of a block 308 for mitigating coverage holes, in accordance with some embodiments.

FIG. 6 illustrates an example of a UX representation for respective APs, in accordance with some embodiments.

FIG. 7 illustrates a flow diagram of an example of a method 700 for identifying coverage holes, in accordance with some embodiments.

FIG. 8 illustrates a block diagram of an example of a device for computing radio resource management (RRM) values, in accordance with some embodiments.

DESCRIPTION OF EXAMPLE EMBODIMENTS

Figure 1:
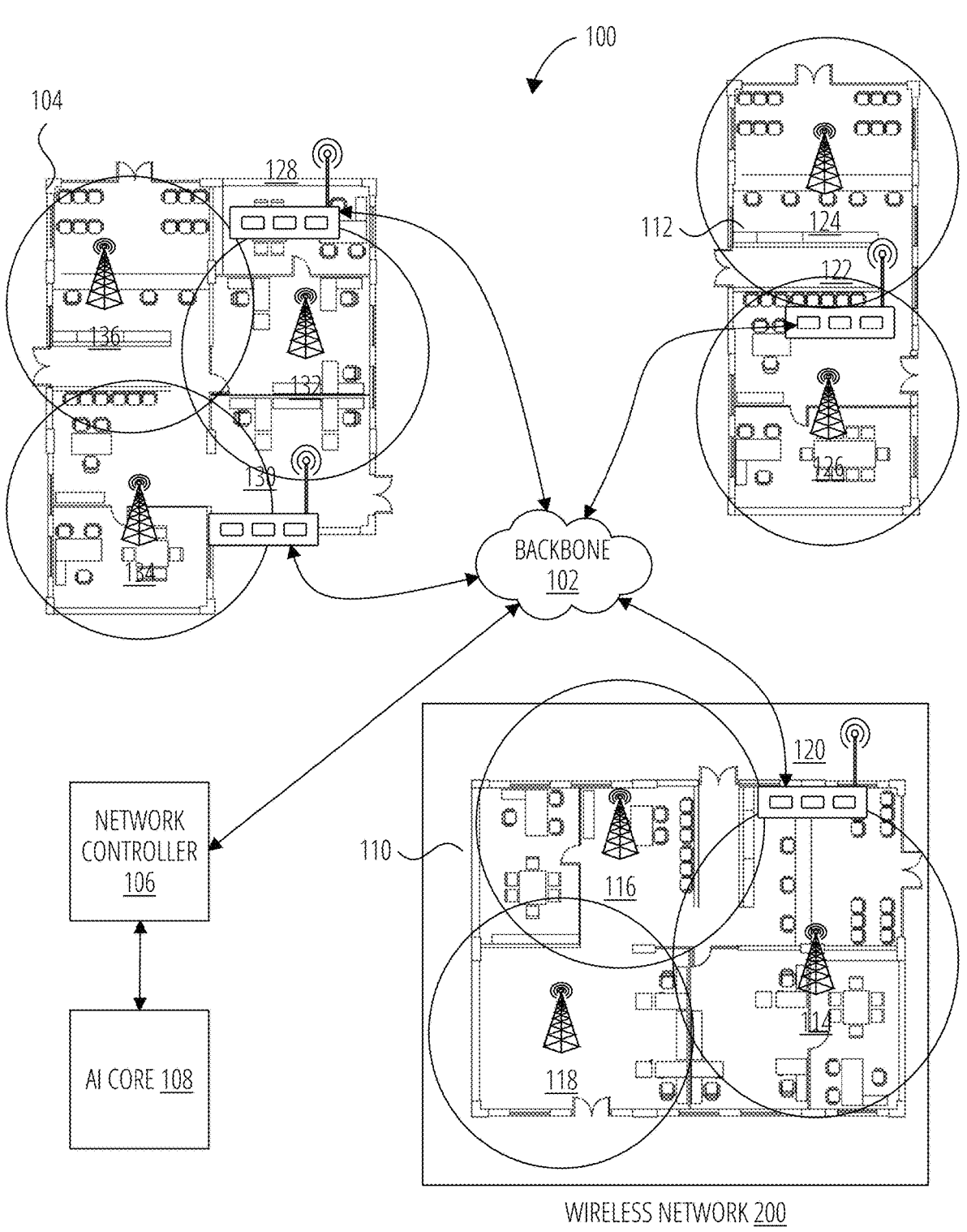
FIG. 1 illustrates a schematic diagram for an example of a system network, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method is provided for determining coverage holes in a wireless network. The method includes determining an up-link (UL) received signal strength indicator (RSSI) representing a strength of UL signals received at an access point (AP) from one or more user equipments (UEs). The method includes determining a down-link (DL) RSSI representing a strength of DL signals received at the one or more UEs from the AP. And the method includes detecting coverage holes in a wireless network based on a comparison of the UL RSSI to a first predetermined threshold and based on another comparison of the DL RSSI to a second predetermined threshold.

In another aspect, the method may also include that determining the DL RSSI includes steps of: (i) sending, from the AP to a selected UE of the one or more UEs, a beacon report request including a request that the UE report measurements representing a magnitude of a signal received by the UE from the AP; (ii) receiving, from the selected UE to the AP, the beacon report; and (iii) determining the DL RSSI of the selected UE based on the received beacon report.

In another aspect, the method may also include that detecting the coverage holes further includes a two-step process includes steps of: (i) detecting a potential coverage hole based on the UL RSSI being less than the first predetermined threshold; and (ii), when the potential coverage hole has been detected, confirming the potential coverage hole is a true coverage hole based on the DL RSSI being less than the second predetermined threshold for one or more UEs that are near an edge of the potential coverage hole.

In another aspect, the method may also include that determining the DL RSSI includes steps of: (i) identifying one or more UEs that are near an edge of the potential coverage hole as UEs for which the UL RSSI being less than the first predetermined threshold; (ii) sending, from the AP to the identified one or more UEs near an edge of the potential coverage hole, a beacon request including a request that the identified one or more UEs report measurements representing a magnitude of a signal received by the one or more UEs from the AP; (iii) receiving, from the one or more UEs to the AP, the beacon report; and (iv) determining the DL RSSI based on the received beacon report.

In another aspect, the method may also include determining that the potential coverage hole is a false positive based on the DL RSSI being less than the second predetermined threshold.

In another aspect, the method may also include that the beacon report is an 802.11k report that is based on the IEEE 802.11k WiFi standard, the first predetermined threshold is −80 dB, and the second predetermined threshold is −80 dB.

In another aspect, the method may also include identifying sticky clients from among the UEs, and excluding the sticky clients from a set of UEs that are used in detecting the coverage holes in the wireless network.

In another aspect, the method may also include that identifying the sticky clients includes steps of: (i) identifying UEs associated with the AP that correspond to a given RSSI that are less than a third predetermined, the third predetermined threshold being less than or equal to a roaming threshold; (ii) sending a beacon report request to respective UEs of the identified UEs for neighboring APs to the respective UEs; and (iii) flagging as a sticky client any UE of the identified UEs for which the given RSSI of one of the neighboring APs is greater than the given RSSI of the AP and for which a quality of service metric for the one of the neighboring AP is comparable or better than for the AP.

In another aspect, the method may also include mitigating the detected coverage holes by: (i) determining neighboring APs to the coverage hole; (ii) selecting a set of one or more APs from the neighboring APs, the set of one or more APs being selected based on having the set of one or more APs being predicted to have a larger affect on the UL RSSI and the DL RSSI than others of the neighboring APs that are not selected; and (iii) increasing a transmit power of APs of the set of one or more APs that have spare operating power budget.

In another aspect, the method may also include predicting a magnitude of the affect of respective APs on the UL RSSI and the DL RSSI based on one or more of a flexible radio assignment metric or a coverage overlap factor metric.

In another aspect, the method may also include sending a recommendation to change locations of the APs or to add another AP, when none of the neighboring APs has spare operating power budget.

In another aspect, the method may also include identifying false negatives for the coverage hole based on the UL RSSI of a first UE being greater than the first predetermined threshold and the DL RSSI of the first UE being less than the second predetermined threshold; and increasing a transmit power of an AP that is near the first UE.

In another aspect, the method may also include providing a report indicating, for respective APs in a wireless network, a number of potential coverage holes and how many of the potential coverage holes were confirmed to be true coverage holes.

In one aspect, a computing apparatus includes a processor. The computing apparatus also includes a memory storing instructions that, when executed by the processor, configure the apparatus to perform the respective steps of any one of the aspects of the above recited methods.

In one aspect, a computing apparatus includes a processor. The computing apparatus also includes a memory storing instructions that, when executed by the processor, configure the apparatus to determine an up-link (UL) received signal strength indicator (RSSI) representing a strength of UL signals received at an access point (AP) from one or more user equipments (UEs); determine a down-link (DL) RSSI representing a strength of DL signals received at the one or more UEs from the AP; and detect coverage holes in a wireless network based on a comparison of the UL RSSI to a first predetermined threshold and based on another comparison of the DL RSSI to a second predetermined threshold.

In another aspect, when executed by the processor, the instructions stored in the memory cause the processor to detect a potential coverage hole based on the UL RSSI being less than the first predetermined threshold; and, when the potential coverage hole has been detected, confirm the potential coverage hole is a true coverage hole based on the DL RSSI being less than the second predetermined threshold for one or more UEs that are near an edge of the potential coverage hole.

In another aspect, when executed by the processor, the instructions stored in the memory cause the processor to determine that the potential coverage hole is a false positive based on the DL RSSI being less than the second predetermined threshold.

In another aspect, when executed by the processor, the instructions stored in the memory cause the processor to identify sticky clients from among the UEs, and exclude the sticky clients from a set of UEs that are used in detecting the coverage holes in the wireless network.

In another aspect, when executed by the processor, the instructions stored in the memory cause the processor to mitigate the detected coverage holes by: determining neighboring APs to the coverage hole; selecting a set of one or more APs from the neighboring APs, the set of one or more APs being selected based on having the set of one or more APs being predicted to have a larger affect on the UL RSSI and the DL RSSI than others of the neighboring APs that are not selected; and increasing a transmit power of APs of the set of one or more APs that have spare operating power budget.

In another aspect, when executed by the processor, the instructions stored in the memory cause the processor to identify false negatives for the coverage hole based on the UL RSSI of a first UE being greater than the first predetermined threshold and the DL RSSI of the first UE being less than the second predetermined threshold; and increase a transmit power of an AP that is near the first UE.

In one aspect, a non-transitory computer-readable storage medium, the computer-readable storage medium including instructions that when executed by a computer, cause the computer to perform the respective steps of any one of the aspects of the above recited methods.

In one aspect, a non-transitory computer-readable storage medium, the computer-readable storage medium including instructions that when executed by a computer, cause the computer to determine an up-link (UL) received signal strength indicator (RSSI) representing a strength of UL signals received at an access point (AP) from one or more user equipments (UEs); determine a down-link (DL) RSSI representing a strength of DL signals received at the one or more UEs from the AP; and detect coverage holes in a wireless network based on a comparison of the UL RSSI to a first predetermined threshold and based on another comparison of the DL RSSI to a second predetermined threshold.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for improved detection of coverage holes to avoid detecting and mitigating false positives. Previously, the method for coverage hole detection (CHD) used in radio resource management (RRM) considered only the up-link received signal strength indicator (UL RSSI) and not the downlink received signal strength indicator (DL RSSI), which can result in false positives in which a region that actually has adequate coverage (not a hole) is mislabeled as being a coverage hole. The problem with this mislabeling is that false positives result in unnecessarily increasing the transmit power from the access point in an effort to cover the mislabeled coverage hole. But increasing the transmit power from the access point can cause co-channel interference, degrading the network performance. By using the down-link (DL) RSSI in addition to the UL RSSI the false positives can be eliminated resulting in fewer changes to the transmit power and less co-channel interference.

The methods, appara-tuses, and systems disclosed herein identify radio frequency (RF) coverage holes in wireless networks. For example, an artificial intelligence (AI) core for the wireless net-work can analyzes received signal strength data to detect potential coverage holes associated with one or more user equipments (UEs). The access points (APs) can collect values for the receive signal strength indi-cator (RSSI) for both downlink (DL) and uplink (UL)

paths. The AI core can then process RSSI histograms for both the UL and DL paths, where the RSSI histograms contain RSSI data correspond-ing to signals transmitted to between the UEs and the APs to identify coverage holes.

For example, the UL RSSI values can be used to identify potential coverage holes, and then the DL RSSI values can be used to either confirm whether the potential coverage holes is actually a coverage hole or is a false positive. In certain examples, the DL RSSI values are obtained only once the potential coverage holes have been identified. For example, the identification of a potential coverage hole can trigger a report request to obtains validating information from bea-con reports, where valid beacon reports are utilized to determine whether a given potential coverage hole represents a false positive or an actual coverage hole.

According to certain non-limiting examples, the methods disclose herein leverage analytics collected from the UEs (e.g., analytics collected through device ecosystem program) to refine the understanding of the RF relationship between the APs and their clients (i.e., the UEs within their respective cells). The methods disclose herein provide several improvements with respect to coverage hole detection and mitigation (CHDM) mechanism. These improvements include avoiding false positives, which can arise when the CHDM mechanism detects a coverage issue, but from the UE's perspective there is not actually a coverage issue).

FIG. 1 illustrates an example of a system network 100 that includes three buildings (i.e., building A 104, building B 110, and building C 112). In this nonlimiting example, the building A 104 includes two wireless LAN controllers (WLCs) and three access points (APs). Here, a first RF Group is formed among the wireless LAN controller WLC A1 128 and access points AP A1 132 and AP A3 136. A second RF Group is formed by WLC A2 130 and access points AP A2 134. The building B 110 includes a single RF group: wireless LAN controller WLC B 122 and access points AP B1 124 and AP B2 126. Finally, building C 112 includes wireless network 200, which has a single RF group, which is made up of one wireless LAN controller (i.e., WLC 120) and three access points (AP1 116, AP2 114, and AP3 118). The WLCs can be, e.g., a CISCO WLC such as WLC model numbers 9800, 8500, 7500, 5520, 5760, 5508, 3850, and 2500. The WLCs can transmit and receive signals to and from the backbone 102. For example, communications between the backbone 102 and the WLCs can be performed via a CAPWAP tunnel.

The settings of the WLCs can be controlled by a network controller 106, which communicates with the WLCs via the backbone 102. For example, the network controller 106 can be a CISCO DNA center, which is a centralized intent-based network management system. The network controller 106 can be based in the cloud, for example. Further an artificial intelligence (AI) core 108 communicates signal to and from the network controller 106. The AI Core 108 can, e.g., signal configuration recommendations, and then some or all of the configuration recommendations can be implemented by the network controller 106, which signals network settings and configurations to the WLCs. The WLCs then apply the configurations and settings to the APs.

For example, the AI Core 108 can receive information such as telemetry data collected on the wireless network 200, and the AI Core 108 processes the received information to generate configuration recommendations for the wireless network 200. The AI Core 108 may be, for example, a cloud based application that learns from the wireless network 200 and from additional wireless networks how best to optimize the network configurations based on data and measured values from the respective networks. The configuration recommendations are then sent from the AI Core 108 to the network controller 106.

The wireless network 200 includes an artificial intelligence (AI) Core 102, a network controller 104, a wireless local area network (LAN) Controller 106, and several access points (APs) (e.g., AP1 116, AP2 114, and AP3 118). Each AP has a surrounding cell in which user devices, such as user equipment 1 (UE1) 114 and user equipment 2 (UE2) 204 can wirelessly communicate with the respective AP of the cell (e.g., cell1 206 surrounds AP1 116; cell2 208 surrounds AP2 114; cell3 210 surrounds AP3 118). As the user device moves from one cell to the next, the user device will change which cell it is communicating with. The wireless network 200 provides wireless communications with one or more wireless devices such as user devices.

A network administrator can interact with the network controller 106 using a graphical user interface (GUI) that enables the network administrator to specify various settings, including, e.g., settings for when to apply configuration recommendations and which of the configuration recommendations to apply at which times and to which parts of the wireless network 200. Then the configuration recommendations can be implemented by the network controller 106 in accordance with the specifications by the network administrator (or other uses).

The wireless LAN controller 120 can communicate with a wide area network (WAN) 206 to allow the user devices to access the internet, for example. The wireless network 200 can be a WiFi network operating in accordance with an IEEE 802.11 protocol.

The AI Core 108 can be used to perform radio resource management (RRM). RRM) allows the wireless network 200 to continuously analyze the existing RF environment, and based on this analysis automatically adjust each APs' power and channel configurations to help mitigate such things as co-channel interference and signal coverage problems. RRM can reduce the need to perform exhaustive site surveys, and RRM can increase system capacity and provides automated self-healing functionality to compensate for RF dead zones and AP failures.

FIG. 3A illustrates an example method 300 for determining coverage holes in a system network 100. One challenge in wireless communications is coverage holes, which occur when UE is located in a gap between/among cells of respective APs. Coverage holes can be remedied by increasing the transmit power of one or more neighboring APs to thereby increase the size of the cells of the neighboring APs. Alternatively or additionally, the coverage hole can be remedied by changing the positions of the APs or by adding an AP to have a cell that spans the area of the coverage hole.

Method 300 for determining coverage holes provides a way to evaluate coverage requirements as the wireless network grows and changes. Monitoring coverage hole enables tracking and identifying areas of the wireless network that might require additional APs or the re-assignment of existing APs. Given the dynamic nature of network growth, this continuous monitoring can be beneficial for timely detecting and mitigating coverage holes. Additionally, coverage hole mitigation has the benefit of addressing short term lapses in coverage by temporarily increasing coverage where needed by extending the reach of existing APs. Further, it has the benefit of providing fault tolerance in the event of an AP failure.

Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

In block 302, method 300 includes determining UL RSSI and DL RSSI values for access points (APs) and UEs. The received signal strength indicator (RSSI) can be an absolute, numeric measurement of the strength of the signal in a channel. The UL RSSI is the RSSI for the uplink channel (i.e., signals sent from the UEs to the AP), and DL RSSI is the RSSI for the downlink channel (i.e., signals sent from the AP to the UEs). Block 302 can be performed by the APs measuring the UL RSSI values based on signals received from the UEs. Thus, the UL RSSI values represent the RF environment from the AP's perspective. The DL RSSI values are measured by the UEs based on signals received from the AP. Thus, the DL RSSI values represent the RF environment from the UEs' perspective. The DL RSSI values can be reported to the AP, e.g., as part of an 802.11k report. According to certain non-limiting examples, the DL RSSI values may be obtained for all the UEs in a cell. According to other non-limiting examples, the DL RSSI values may be obtained only for UEs that are determined to be near an edge of the cell (e.g., UEs for which the UL RSSI is less than a given threshold, such as −80 dB).

In block 304, method 300 compares the UL RSSI and DL RSSI values to respective thresholds. For example, these respective thresholds can be the same threshold (e.g., −80 dB) or different thresholds. According to certain non-limiting examples, a two-step process is used in which the UL RSSI values are first compared to the threshold to determine potential coverage holes. Then, for selected UEs having UL RSSI values less than the threshold, DL RSSI values are collected from the selected UEs (e.g., by requesting 802.11k reports from the UEs), and then the DL RSSI values are compared to the threshold.

In block 306, method 300 includes determining a coverage hole exists when both UL RSSI and DL RSSI values are below the thresholds. According to certain non-limiting examples, when both UL RSSI and DL RSSI values are below the −80 dB threshold for a predetermined duration, then the a potential coverage hole is confirmed to be a true coverage hole. When only one of the UL RSSI and DL RSSI values is below the threshold, then the potential coverage hole is determined to be a false positive (or a false negative, as discussed below). A false negative can occur when the DL RSSI values are below the threshold but the UL RSSI values are not below the threshold, then, even if coverage hole is not identified, the UEs may nevertheless be suffering from poor performance, making an increase in the AP transmit power advantageous.

According to certain non-limiting examples, potential coverage holes are only determined when signals from at least one UE results in UL RSSI values below the threshold. For example, potential coverage holes are identified based on the UL RSSI values being less than the threshold. Then, comparing the DL RSSI values to the threshold can occur after the potential coverage holes have been identified. For example, identifying potential coverage holes can be performed by comparing the UL RSSI values to first set of thresholds (e.g., −80 dB for data and −75 dB for voice) for a first duration. Then, the step of confirming whether the identified potential coverage holes are true coverage holes can include comparing the UL RSSI and DL RSSI values to a second set of thresholds (e.g. 80 dB) for a second time duration (e.g., 90 seconds).

According to certain non-limiting examples, potential coverage holes are only determined when signals from at least one UE results in UL RSSI values below the threshold. When this condition fails, the DL RSSI values is not compared to the threshold.

Confirmation that the identified potential coverage holes are true coverage holes can also depend on other corroborating data/evidence. For example, confirmation of a true coverage holes may depend on how many UEs have UL RSSI and DL RSSI values below the threshold. Additionally or alternatively, confirmation of a true coverage holes can depend on a minimum failed client count per AP, which is the minimum number of clients that must be in a coverage hole before mitigation can be considered. Further, a coverage exception level can also be used. The coverage exception level sets a percentage of the overall clients that must be in a coverage hole in order for mitigation to be considered. Alternatively, confirmation of true coverage holes can be considered separately from whether mitigation will be performed.

Confirmation of the potential coverage holes as being true coverage holes can further include various processes performed by the AI Core 108 to analyze the information provided by the requested reports from the UEs (e.g., the 802.11k reports) together with the UL RSSI values and possibly additional information collected by the AP and by other APs within an RF zone/neighborhood/group. For example, a machine learning (ML) method could be used to learn hidden patterns in the collected information/data representing correlations that indicate true coverage holes and help to discriminate the true coverage holes from the false positives.

According to certain non-limiting examples, the AI Core 108 processes the coverage hole event information provided by the AP(s) together with the 802.11k report(s) collected from the UE(s). If the information from the 802.11k report(s) combined with the information collected from an event report from the AP demonstrates a correlation exceeding a predefined correlation threshold, and the collected information confirms a downlink signal to noise ratio (DL SNR) is greater than a certain signal cutoff (e.g., 15 dB), then the reported coverage hole is classified as false positive. If the 802.11k report(s) from the UE(s) combined with the reports from the AP(s) demonstrate a correlation exceeding the predefined correlation threshold, and the collected information confirms a DL SNR is less than the certain signal cutoff, then the event is classified as a "True Coverage Hole." A third option is also possible, in which the 802.11k report(s) from the UE(s) combined with the reports from the AP(s) fail to demonstrate a correlation exceeding the predefined correlation threshold. In this case, the potential coverage hole can neither be confirmed nor disconfirmed, and the AI Core 108 seeks additional measurements.

In block 308, method 300 includes mitigating the confirmed true coverage holes. Determining the best option for mitigating the coverage hole can be complicated. Generally, the APs themselves will not make this determination, and the wireless LAN controller 120, network controller 106, or preferably the AI Core 108 will make the determination. Further, the determination and functions recited in block 302, block 304, and block 306 can be performed by the UEs, the APs, the wireless LAN controller 120, network controller 106, the AI Core 108, or any combination thereof.

FIG. 3B illustrates respective steps of block 308 for mitigating the coverage holes. First, the decision whether to mitigate in not trivial because the TPC algorithm has already determined that the current transmit powers are optimal to provide coverage while avoiding co-channel interference. Thus, changes deviating from the optimal network settings and transmit powers determined by the TPC algorithm can adversely impact the network performance. For example, increasing the transmit power from an AP to mitigate a coverage hole might increase co-channel interference and thereby adversely affect the overall network performance.

Mitigation can be a fairly simple process once the decision to mitigate is made. Increasing the AP transmit power is not the only option for mitigation, but increasing the AP transmit power is the simplest and it is one of the few options that can be automated because some of the other options require actions by a network administrator, as discussed below.

According to certain non-limiting examples, if a coverage hole exists meets certain criteria for mitigation (e.g., the certain criteria can be a minimum number of clients and a minimum percentage clients in the coverage hole), then the AP will increase power by one step. Coverage hole detection process can then be repeated to determine if the coverage hole still exists. If additional mitigation is called the power can again be increased by one step. This prevents wild and unstable swings in power. Coverage hole mitigation, while operating independent of RRM's DCA and TPC, can have a profound effect on surrounding APs and the balance of the RF in an environment. Part of the decision to mitigate is to evaluate if mitigation could be successful. Increasing the power of a given AP independently of the RF Group metrics is reasonably likely to negatively impacting surrounding APs. So increasing AP transmit power is applied judiciously.

In step 310, block 308 includes determining nearest APs to the coverage hole. Even though the coverage hole may have been identified and confirmed by a given AP, the coverage hole is not within the cell of any one AP. Rather, the coverage hole is generally between two or more APs. Thus, the given AP detecting the coverage hole might not provide the best option for mitigating the coverage hole. Further, the coverage hole may have also been identified and confirmed by another AP on another side of the coverage hole. The spatial coordinates of the UEs used to identify and confirm the coverage hole are located around the periphery of the coverage hole and can be used to determine the location of the coverage hole.

In step 312, block 308 includes increasing the transmit power of one or more of the nearest APs. The decision of which AP has its transmit power increased can depend on several factors. For example, the transmit power should not be increased beyond a maximum limit (e.g., the transmitter power output maximum (TPO Max)). Therefore, transmit power can only be increased for APs that are not at the maximum limit. For example, if a set of nearest APs have spare operating power budget, then the AI Core 108 causes an increase to the transmit power for one or more of the set of nearest APs having spare operating power budget.

For example, when an AP is already be operating at (or near) the highest power, neighboring APs can be considered for increased transmit power to mitigate the coverage hole, rather than increasing the transmit power of the AP.

On the one hand, if there are no neighbors near the identified coverage hole or if neighbor APs are also operating already at (or near) the highest power (e.g., the neighbor APs report transmit powers that are +3/6 dB within TPO Max), then the identified coverage hole can be labeled as an RF dead zone. When the identified coverage hole is labeled an RF dead zone, the alternative actions discussed in step 314 can be used to mitigate the coverage hole in the RF dead zone (e.g., a network administrator can add more APs or change the placement of existing APs).

On the other hand, if there are neighbors near the identified coverage hole that have spare operating power budget or if neighbor APs are also operating already at (or near) the highest power operating power budget, then there are a couple of options for mitigating the coverage hole by increasing power: (i) simply increase the transmit power of the neighbor APs or (ii) perform additional analysis to select a subset of the neighbor APs to increase their transmit power.

First, the coverage hole can be mitigated by simply increasing the transmit power of the neighbor APs. That is, increase the transmit power of the neighbor APs to reduce coverage hole detection (CHD) triggers on the AP that is already be operating at (or near) the highest transmit power. A drawback of this simple approach is that increasing the transmit power for some of the neighbor APs may be unnecessary because the increased transmit power on these APs might not contribute to mitigating the coverage hole due, e.g., to the location where they are installed or other factors such as their RF configuration, etc.

Second, the coverage hole can be mitigated by performing additional analysis to select one or more neighbor APs most likely to affect the coverage hole, and then the transmit power is increased only on the selected one or more neighbor APs. For example, the coverage hole can be mitigated by signaling network administrator to modify the AP locations or to add one or more APs. For example, the AI Core 108 can check for flexible radio assignment (FRA) metrics and coverage overlap factor (COF) metrics that indicate the amount that respective APs contribute to coverage at locations immediately surrounding the coverage hole. Then, the transmit power is increased for only those APs that predominately contribute to coverage at locations immediately surrounding the coverage hole.

The inquiry into which APs that predominately contribute to coverage at locations immediately surrounding the coverage hole can include increasing transmit power on the UEs that are located near a periphery of the coverage hole, and take a snapshot of client reported neighbor report near the coverage hole detection (CHD) event. Based on the snapshot, identify the top one or more neighbor APs, and then only increase transmit power to these top one or more neighbor APs. According to certain non-limiting example, the power is increased to the transmit power to these top one or more neighbor AP incremental one-by-one to avoid unnecessary increases in the transmit power.

In step 314, alternative solutions to mitigate the coverage hole are tried, when increasing AP transmit power does not correct coverage hole. For example, an AP may be located next to a pillar or other obstruction that casts an RF shadow such that increasing the transmit power is ineffective to remedy coverage holes in the RF shadow. In this case, the coverage hole can be mitigated by changing the location of the AP or by adding additional APs that provide coverage to the shadowed region.

Additionally, coverage hole detection could be triggered by sticky clients, which occurs when a UE continue to associate with a given AP even though the UE has changed location to the cell of another AP. That is, the device fails to roam to the new AP and the low signal from the original AP causes power wireless performance. When this occurs the UL RSSI and DL RSSI values can be low even though there is not actually a coverage hole. This can be remedied, e.g., by identifying sticky clients and nudging (or forcing) them to disassociate with the original AP so that they can associate with the new AP.

Sticky clients can be identified in a number of ways. First, the 802.11k reports can include a Neighbor Report. Based on the Neighbor Report, UEs can be identified that have a neighbor AP with better RSSI values than the associated AP. These identified UEs can be recognized as consistently sticking to older APs irrespective of UEs current location. This first case tends to be UE dependent and can be independent of which particular AP the UE is currently associated with.

In contrast, the reverse hidden node issue present a second case, which is discussed now. A reverse hidden node results in UEs tending to stick to a particular AP, resulting in a sticky client problem that is AP dependent, rather than UE dependent. For example, UEs can be sticky around a particular AP only. This can occur when there is line-of-sight (LoS) wireless transmission between respective APs, but there is non-line-of-sight (nLoS) wireless transmission between an AP and a UE (e.g., due to a pillar or other obstruction).

Sticky clients can be identified in a number of ways. According to certain non-limiting examples, potential sticky client issues can be identified using a similar method to identifying potential coverage holes. Preferably a higher RSSI threshold is used for identifying potential sticky client issues, such that the sticky clients can be identified and addressed before they result in erroneously identified coverage holes. For example, UEs can be identified that have UL RSSI (or DL RSSI) values that fall below the roaming threshold. Some UEs roam at −70 dB and others at −75 dB. Accordingly, a trigger at −75 dB or −78 dB (to provide a margin) can be reasonably for identifying potential sticky clients. This can be similar to how pre-coverage holes are identified in the CHDM algorithm used for RRM. Also like in the CHDM algorithm used for RRM, this inquiry can occur over a predefined time period (e.g. twice 90 seconds).

Given that the above-noted conditions are met and a potential sticky client even has been triggered, a beacon report request is sent to the UE(s) identified as sticky clients. The beacon report request triggers the UE(s) to provide a report of neighboring APs. This beacon report request can be for all channels, or can based on AP top N neighbors. Upon receiving the report, the AP collects the measured RSSI values that are received from the UE(s). If RSSI values for a neighboring AP is 8 dB better than the RSSI values for the current AP and if the quality of service enhanced basic service set (QBSS) is low are at least comparable for the current AP relative to the neighboring AP, then the UE is flagged as being a sticky client.

When a sticky client has been flagged, various remedial actions can be taken by the AI Core 108 or can be recommended to the network administrator. For example, the sticky client can be forced to roam. Roaming can be optimized using the data RSSI threshold setting from the CHDM algorithm in RRM to set an optimized roaming threshold at which a UE will be gracefully disassociated from the current AP.

Identifying and remediating sticky clients can be performed after the potential coverage holes have already been identified. Alternatively or additionally, there are benefits to remediating sticky clients before identifying potential coverage holes because so doing preempts the possibility that the sticky clients result in misidentifying the sticky clients as being on the edge of potential coverage holes.

Regarding identifying occurrences of the reverse hidden node issue, in the worst-case scenario with respect to LoS, the UE has LoS with respect to a first AP (AP1), and the first AP has LoS with respect to a second AP (AP2). But the UE lacks LoS with respect to the second AP. In this case, by linearizing the free-space path loss (FSPL) equation, the following inequality can be derived:

$$\text{signal}\{UE, AP2\} >= (\text{signal}\{UE, AP1\} + \text{signal}\{AP1, AP2\}).$$

When this inequality is violated, there is likely an obstacle between UE and AP2, preventing UE from seeing AP2, and the AI Core 108 can flag this event accordingly. When this occurs, various reports can be provided to the network administrator alerting them to the issue and recommending remedial measures, such as adding additional APs, changing the locations of the existing APs, or both.

Figure 5:
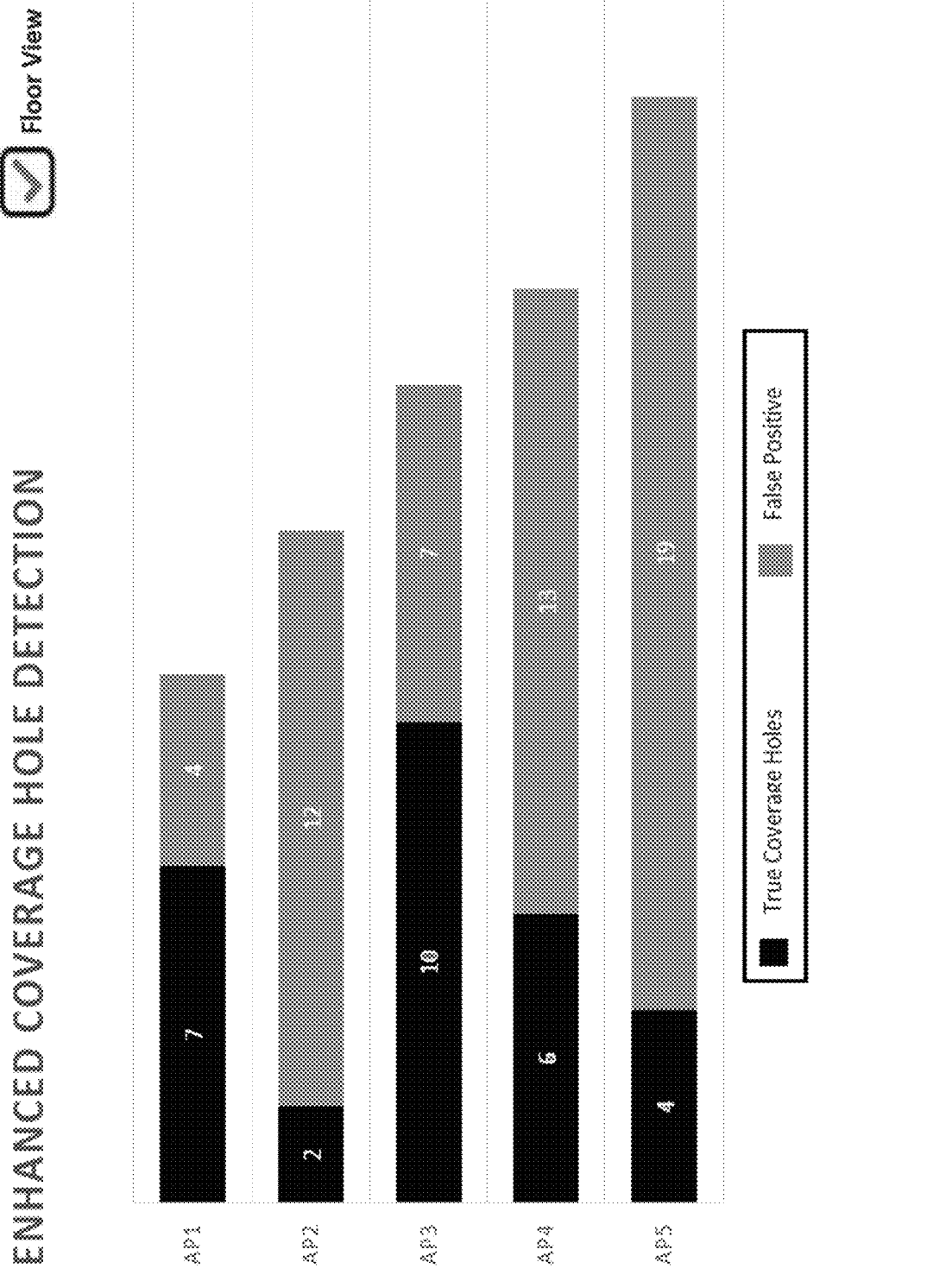
FIG. 5 illustrates an example of a bar chart for true coverage holes and false positives of respective access points (APs), in accordance with some embodiments.

In addition to the AI Core 108 taking various actions to directly address the coverage holes, the AI Core 108 can also generate alerts, charts, and/or reports that are displayed to a network administrator that increase awareness of the coverage holes and enable the network administrator to take informed actions to mitigate the coverage holes. FIG. 5 and FIG. 6, which are discussed below, illustrate examples, of such charts and tables that can be displayed to a network administrator. Additionally, the coverage holes can be organized and reported by RF zones to more intuitively and efficiently inform the network administrator regarding the coverage holes.

Reporting coverage holes by RF zones can include a series of steps. According to certain non-limiting examples, APs that are reporting coverage holes can first be correlated by RF proximity. For example, among the APs reporting higher coverage holes, the AI Core 108 can check if the APs have RF neighbors with signal cutoff of greater than or equal to −60 dBm. Further, the coverage-hole report by RF zones can report coverage holes for each AP and the first hop neighbors of said AP. For example, the report can provide this level of information in a detailed view that is accessible by clicking on the respective APs within the report window. Additionally, the following information can be collected and provided in the report:

1. Neighbor density Metric (NDM);
2. Total client count in the neighborhood;
3. Total low signal client count (<−80 RSSI);
4. Total low data rate client count (<9 Mbps); and
5. Total client hole reported in the neighborhood.

Further, the report can indicate the existence of a coverage hole zone when the following criteria are satisfied:

1. 20% of client is low signal client;
2. 20% of client is low data rate client; and
3. more than 3 coverage holes reported per each AP last one week.

Additional reports can also be beneficial to help the network administrator avoid taking corrective measures that might adversely impact the system network 100. For example, the network administrator can benefit from a report regarding channel RF Statistics to assess RF conditions on the floor. Such a report can include, e.g.:

1. Noise Floor Metrics;
2. DL RSSI Signal;
3. Beacon RSSI from other APs;
4. Wi-Fi Interference Metrics; and
5. TxPower embedded in the Probe/Association Request or Management/Control Frames.

Returning to block 302, an AP can collect UL RSSI values and generate a histograms thereof by monitoring the received power from the UEs. According to certain non-limiting examples, potential coverage holes can be flagged based on a 5 second histogram of UL RSSI values received and maintained by the AP. For example, values between −90 dBm and −60 dBm are collected in a histogram in 1 dB increments. A client falling below the configured RSSI thresholds for 5 seconds is marked as a potential coverage hole event. Potential coverage holes can be reported to the wireless LAN controller 120 and tracked upstream by the network controller 106 or the AI Core 108.

According to certain non-limiting examples, no mitigation action is performed on potential coverage holes, which are instead tracked at the wireless LAN controller 120 over a predefined time interval (e.g., a 90 second cumulative histogram). A potential coverage hole becomes confirmed after querying the UEs in and/or near the potential coverage hole for DL RSSI values and confirming that the DL RSSI values are also below a predefined threshold.

Figure 4:
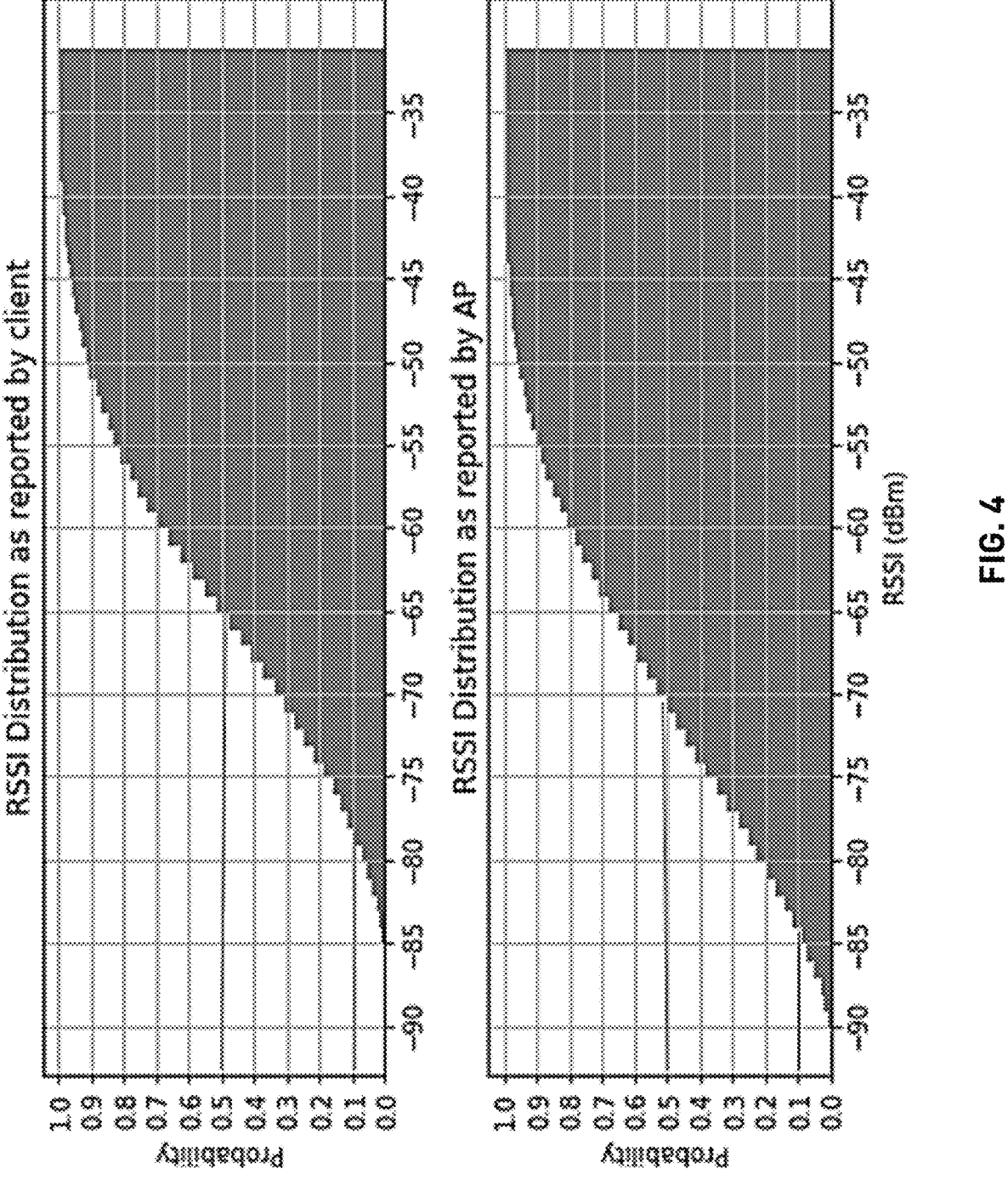
FIG. 4 illustrates an example of histogram plots for an uplink received signal strength indicator (UL RSSI) and downlink received signal strength indicator (DL RSSI), in accordance with some embodiments.

FIG. 4 shows on top an example of a histogram for RSSI distribution as reported by client (i.e., DL RSSI values). Further, FIG. 4 shows on bottom an example of a histogram for RSSI distribution as reported by AP (i.e., UL RSSI values). It can be seen that more low values are reported for the UL RSSI than are reported for the DL RSSI. Consequently, what appears as a coverage hole based on the UL RSSI values might be a false positive based on the DL RSSI value. By confirming potential coverage holes based on the DL RSSI values, these false positives might be avoided, eliminating unnecessary coverage hole mitigation actions. This can improve network performance because unnecessary coverage hole mitigation actions can adversely affect network performance by, e.g., increasing co-channel interference or increasing the work load of network administrators.

Evidence suggests that the example illustrated in FIG. 4 in which the DL RSSI is reported higher than the UL RSSI is typical. Previously, WLAN controller modules (e.g., wireless LAN controller 120) perform client admission and steering decision solely based on UL RSSI values. UL RSSI based decisions, however, fail to address association issues and invite co-channel contention in the localized RF neighborhood The difference in FIG. 4 between the histograms for UL RSSI and DL RSSI can arise from various factors that cause asymmetry between the uplink path loss (i.e., from the UE to the AP) and the downlink path loss (i.e., from the AP to the UE). For example, the contrast in the histograms for UL RSSI and DL RSSI can arise from: (i) differences in operating transmit power; (ii) antenna gain; (iii) the number of transmit (Tx) chains and front-end variations; or (iv) any combination thereof.

Regarding differences in operating transmit power, in order to maximize power savings on the stations, most of the vendors of UE do not offer the highest allowed power by the regulatory domain on the mobile devices. The situation will become compounding for UEs configured according to Wi-Fi8 (as well as Wi-Fi7/6E), which are required to operate at 6 dB lower power budget than the serving Access Point for low power indoors (LPI) operation.

Regarding antenna gains, RF front ends on stations are designed very differently than of the infrastructure APs, resulting in a significant difference (delta) in the antenna gains between a higher class of infrastructure APs relative to UEs. For example, smartphone antennas often use a planar inverted F-type antenna (PIFA) form factor, which can sometimes have a negative antenna gain.

Regarding the number of Tx chains, a majority of the Wi-Fi7 APs support 16 spatial streams (SS). In contrast, most Wi-Fi7 UEs support fewer than 16 SS, with many UEs supporting not more than 8 SS and a majority of UEs supporting between 4 SS and 2 SS. These difference in the number of SS supported results in lower transmitter power output (TPO) budget for the UEs.

Given the above factors, there can be an asymmetry between the UL RSSI and the DL RSSI. Consequently coverage hole detection based solely on UL RSSI values (i.e., based on the APs view of the RF environment), can lead to false positives because the DL RSSI values (i.e., the UEs' view of the RF environment) can indicate acceptable transmission levels even though the UL RSSI values indicate the transmission levels are too weak.

FIG. 5 shows a bar graph for 5 APs, which are numbered AP1, AP2, . . . , AP5. The black portion of the bar for each AP shows the number of true coverage holes, and the grey portion of the bar shows the number of false positives, with the sum of the false positives together with the true coverage hole being the total number of potential coverage holes for the respective AP over a specified period. For example, regarding AP1, 11 potential coverage holes were found based on the UL RSSI values falling below a predefined threshold (e.g., the threshold could be −80 dB for data or the threshold could be −75 dB for voice). Then based on the DL RSSI values, 7 of the 11 potential coverage holes were determined to be true coverage holes based on the DL RSSI values falling below the predefined threshold, and the remaining 4 potential coverage holes were determined to be false positives.

FIG. 6 shows an example of a UX representation for 3 APs. The UX representation provides for each AP a roaming count, a number of client associations, and average client count, whether a coverage hole is detected (with percentage), and RSSI value, and a transmit power (TxPower).

The "enhance coverage hole detection" chart shown in FIG. 5 and the UX representation shown in FIG. 6 are examples of reports that can be generated and displayed to a network administrator to provide insights regarding the performance of the system network 100. For example, the network administrator can use the information regarding the prevalence of false negatives for certain of the APs to inform their decisions regarding possible remedial actions.

FIG. 7 illustrates an example method 700 for determining coverage holes in a system network 100 (similar to method 300). Method 700 has additional benefits relative to method 300, and is further adapted to take advantages of features in UEs configured for Wi-Fi7/Wi-Fi8 and to take advantages of features found in UEs configured for multilink multi-radio (MLMR) and/or multilink multi-radio (MLSR).

For example, in the 6 GHz spectrum, unified wireless LAN networks optimize Wi-Fi7 radio cell size in order to provide best possible downlink coverage and performance to Wi-Fi7 MLSR and MLMR stations along with legacy high efficiency WLAN (HEW) APs (e.g., APs configured according to the IEEE 802.11ax standard). Amongst the core aspects of the AP-cell-size management, coverage hole detection is an optimization algorithm that ensures these high-performance stations don't sustain DL link degradation and coverage holes in the specific areas of the floor and maintain higher SNR to achieve best in class performance by extreme high throughput (EHT) capable APs.

Despite many advancements in the AP and UE capabilities in Wi-Fi7 standard, coverage hole detection still relies on an AP centric view of the wireless network. According to the Wi-Fi7 standard, when an AP receives a UL signal from the UE(s), the AP assumes reciprocity in the bidirectional communication and assumes similar DL signal will be received at the UE. This assumption can fail, as evidenced by benchmarks for collected data that show a significant difference (e.g., up to 6-8 dB) between UL RSSI and DL RSSI for signals transmitted between an AP and a UE, as illustrated in the RSSI histograms shown in FIG. 4.

As discussed above, there can be an asymmetry between the UL RSSI and the DL RSSI. Consequently coverage hole detection based solely on UL RSSI values (i.e., based on the APs view of the RF environment), can lead to false positives because the DL RSSI values (i.e., the UEs' view of the RF environment) can indicate acceptable transmission levels even though the UL RSSI values indicate the transmission levels are too weak. To maximize performance and provide effective coverage for high-performance MLMR and MLSR UEs, it is advantageous to make coverage hole determination based on both the UL RSSI and DL RSSI values, rather than based on the UL RSSI values alone.

Method 700 improves on previous methods for CHDM by assessing and incorporating the floor-view information from UEs and using this information when adjusting the transmit power of an AP near a coverage hole, thereby avoiding false positives and false negatives with respect to potential coverage holes. Previous methods for CHDM (e.g., using an AP-to-AP legacy systems) false positives were declared a coverage hole, even though the wireless performance from the UEs perspective was still adequate. Relatedly, with false negatives, the AP-to-AP system does not detect any issue, even though UEs are suffering from insufficient signals from the AP. Method 700 improves on the previous RRM technique by detecting and suppressing both false positive and false negatives.

Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

At block 702, method 700 includes monitoring the active UEs within the cell of an AP. Of the monitored UEs, some will be near the cell edge, and these can be determined and selected, e.g., based on the UL RSSI values received at the AP from the UEs. By monitoring the UEs, it is possible to determine if there is a potential coverage hole beyond the edge of the cell. For example, when a certain number of the UEs (e.g., the selected UEs near the cell edge) have UL RSSI values that are less than a predefined threshold (e.g., −80 dB), then it can be determined that there is a potential coverage hole. This determination can activate trigger for the selected UEs to assess the RF environment. For example, the trigger can be signaled in management information sent to the selected UEs, or by a value in a header of a data packet sent to the selected UEs.

According to certain non-limiting examples, block 702 includes monitoring the active UEs associated the cell of an AP. In the course of the UEs exchanging data with the AP, the APs near the edge of the cell are selected based on the signals received at the AP from the UEs (e.g., a histogram of the UL RSSI), triggering a request to the selected UEs for a report(s) assessing the RF environment from the point of view of the UEs (e.g., the DL RSSI).

At block 704 of method 700, upon trigger activation, the AP sends request for report(s) from the selected UEs near the cell edge. According to certain non-limiting examples, the triggers are selectively sent to the selected UEs. Determining which of the UEs the trigger is selectively applied can be performed in various ways.

On the one hand, for a UE that adheres to dynamic transmit power control (DTPC), transmit power envelope (TPE), and the maximum RRM equivalent isotropic radiated power (RRM_EiRP_Max), the RF loss for the downlink path (DL_path_loss) can be calculated based on the AP's current link power, station budget, and the reported UL RSSI at the AP. When the calculated DL_path_loss projects a weaker downlink signal at the UEs, then measurement reports can be triggered from a multilink multi-radio (MLMR) or multilink multi-radio (MLSR) UEs on each of their active links.

On the other hand, for other UEs (e.g., UEs that do not adhere to the DTPC etc.), the UL RSSI readings and fluctuations at the AP can be monitored over time. In this case, a trigger frame can be sent when UL RSSI falls below certain signal level (e.g., when the UL RSSI falls below −80 dB) for a predefined period.

According to certain non-limiting examples, upon trigger activation, the AP can send an on-demand 802.11k beacon report request to all the selected UEs that have been determined to be near the edge of the cell.

At block 706 of method 700, the AP receives the report(s) from the selected UEs.

At block 708 of method 700, the report(s) is processed to determine whether coverage hole event is true or false positive. According to certain non-limiting examples, the AI Core 108 processes the information collected by the AP for the coverage hole event together with the 802.11k report(s) collected from the selected UEs.

According to certain non-limiting examples, a coverage hole event is classified as a false positive, if the combination of the information of the coverage hole event together with the 802.11k report(s) evidences a strong correlation and a DL_signal (SNR) is above certain signal cutoff (e.g., 15 dB).

According to certain non-limiting examples, a coverage hole event is classified as a true positive, if the combination of the information of the coverage hole event together with the 802.11k report(s) evidences a strong correlation and the DL_signal (SNR) is below the certain signal cutoff.

If, however, the above-noted correlation is weak, the AI Core 108 can request additional information to further investigate whether a coverage hole exists.

At block 710 of method 700, the method includes determining additional false negatives for case with UL RSSI above threshold but DL RSSI below threshold. For the stations reporting a value for RRM_EiRP_Max, measurements can be periodically collected from the most active UEs or from UEs with higher latency/jitters reported. If the DL signal estimates falls below SNR cutoff while the values reported for the UL RSSI d is above the threshold, then this coverage hole event can also be flagged this a false negative coverage hole. The combination of measurements in this case indicates that the AP didn't report coverage issues but the UE was experiencing coverage holes.

According to certain non-limiting examples, for UEs reporting RRM_EiRP_Max, measurements are periodically collected from the most active APs or from APs for which greater latency/jitters is reported. If the DL_signal estimates falls below a predefined SNR cutoff while UL RSSI reported as being strong, then this event is flagged as a false negative coverage hole. This combination of measurement results indicates that the AP did not report coverage issues but one or more UEs are nevertheless experiencing coverage holes.

At block 308 of method 700, mitigation is performed with respect to the detected coverage holes is performed at block 308.

According to certain non-limiting examples, upon a coverage hole event being classified as a true positive, the AI Core 108 (with the assistance of the RRM algorithms/processes being executed by the network controller 106, wireless LAN controller 120, and/or AP) performs mitigation of the coverage hole. For example, a local greedy optimization process can be performed at the network edge for an individual AP or for an on-prem controller. The greedy optimization process increases the transmit power of one or more APs to mitigate the coverage hole. As discussed above, this process for mitigating coverage hole is an improvement over previous processes because the decision to mitigate have the benefit of cloud-assisted guidance to distinguish false positives from true coverage holes or false negative events.

According to certain non-limiting examples, if coverage hole is classified as a false negative (e.g., the AP failed to detect a coverage hole, but UEs are suffering due to low values for the DL RSSI), then the transmit power (TxPower) of the AP can be incrementally increased (within allowed regulatory limits) during successive cycle until the downlink signal is sufficiently high to provide adequate performance (e.g., the DL RSSI exceed a predefined threshold).

According to certain non-limiting examples, if the coverage hole is classified as true coverage hole and if the UE adheres to RRM_EiRP_Max, then the AP can increase the RRM_EiRP_Max to improve the UL signal. Alternatively or additionally, the AP can change an operational mode to standard power (SP) from low power indoor (LPI), if such a change is allowed by the AP.

Additional details and examples of block 308 that were provided with reference to FIG. 3 are not repeated here.

Figure 2:
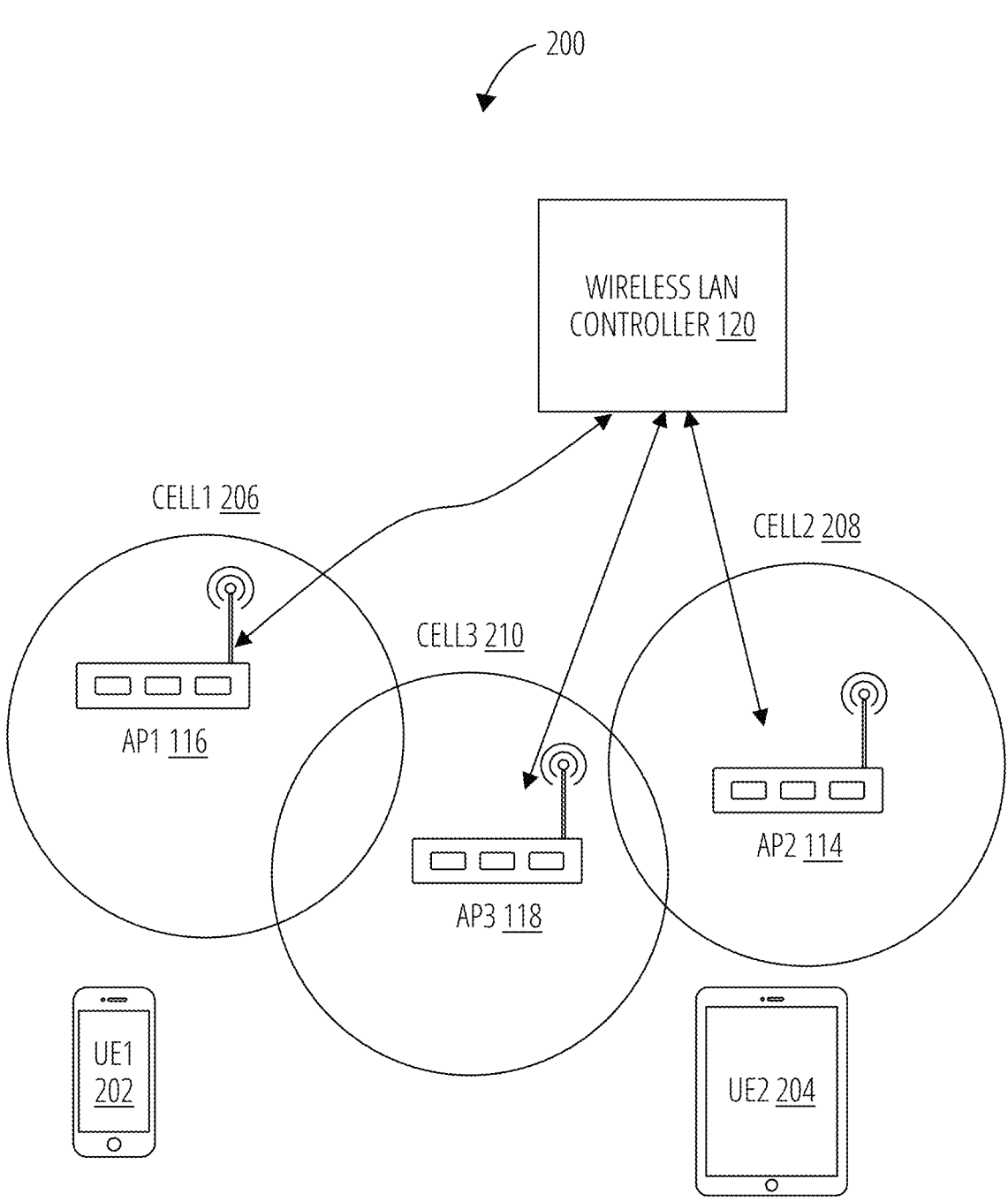
FIG. 2 illustrates a schematic diagram for an example of a wireless network within the system network, in accordance with some embodiments.

RRM includes several algorithms, which together provide management of the wireless network 200. FIG. 8 illustrates a computing device 802 that performs various RRM steps/methods. Device 802 can be a performed using distributed computing. Some or all of the functions of device 802 can be performed by the WLCs, and some or all may be performed by the network controller 106 and/or the AI Core 108. In some embodiments, the device 802 can be an embodiment of the AI Core 108, illustrated in FIG. 2. In some embodiments, the functions attributed to device 802 might reside across the AI Core 108, network controller 106, and other devices illustrated in wireless network 200. The device 802 includes a processor 204 that performs the steps of the respective methods when executing the respective methods stored in the memory 806. The methods stored in the memory 806 can include, for example: (i) RF Grouping 816 (e.g., an algorithm responsible for determining the RF Group Leader and members); (ii) Flexible Radio Assignment (FRA) 814 (e.g., an algorithm charged with identifying redundant radios resources and re-assigning the resource to a better role); (iii) Dynamic Channel Assignment (DCA) 808 (e.g., a global algorithm that runs on the RF Group leader); (iv) Transmit Power Control (TPC) 210 (e.g., a global algorithm that runs on the RF Group Leader; and (v) Coverage Hole Detection and Mitigation (CHDM) 212 (e.g., a local algorithm that runs on each individual controller). The respective methods help to maintain optimal performance by optimally applying resources to balance various countervailing interest.

For example, increasing the transmit power in a cell (e.g., cell1 206 of an AP1 116) might help to overcome noise from the environment, but too much of an increase in the transmit power could cause interference with neighboring cells (e.g., cell3 210 of AP3 118), especially in regions where two or more cells overlap. If two cells overlap one another and the cells are on the same channel, then they share the spectrum, resulting in diminished communication capacity. Not only are users of each cell sharing the single channel of available spectrum, the management traffic also increases, which also takes up a part of the channel capacity. The result is higher consumption of air time and less throughput. This is commonly known as co-channel interference. Assuming that all wireless devices are operating on the same network, two aspects of the wireless network 200 can be controlled to mitigate co-channel interference. For example, to adjust any given cell in response to co-channel interference, the wireless network 200 can adjust the channel plan to facilitate the maximum separation of one AP from another AP on the same channel, and the wireless network 200 can adjust power levels to increase or decrease the size of the effective cells corresponding to respective APs. If more than two channels are available, neighboring cells can operate on different channels, thereby avoiding interference in overlapping regions between cells.

The use of RRM has several advantages including several features which manage specific traffic types or client types which can greatly increase the spectral efficiency and assist RRM in providing a better experience for users. The RRM can be organized according to a hierarchy with an RF Group Name at the top level, then RF Group leader(s) at the next level, which are then followed by RF Neighborhood(s) at the lower level. For any RF Group Name, multiple RF group Leaders may exist (e.g., one or more RF group Leaders in the 2.4 GHz band and one or more RF group Leaders in the 5 GHz band). An RF Group Leader can manage multiple RF Neighborhoods.

As used herein, the term "signal" refers to RF emanating from APs belonging to the same RF group. The term "interference" refers to signals (e.g., Wi-Fi signals) that interfere with a desired signal, such as signals do not belong to other networks (rogues). The term "noise" refers to any signal that cannot be demodulated according to the protocol of the wireless network 200 (e.g., any signal that is not an 802.11 signal). For example, noise can be from a non-802.11 source (such as a microwave or Bluetooth device) or from an 802.11 source whose signal is below sensitivity threshold of the receiver or has been corrupted due to collision or interference. The term "dBm" refers to an absolute, logarithmic mathematical representation of the strength of an RF signal (e.g., dBm directly correlates to milliwatts, but may also be used to represent output powers in the very low values common in wireless networking). The term "RSSI" or "Received Signal Strength Indicator" refers to an absolute, numeric measurement of the strength of the signal in a channel. The term "Noise floor" refers to the ambient RF Noise level (e.g., an absolute value expressed in dBm) below which received signals are unintelligible. The term "SNR" refers to a ratio of signal strength to noise floor, which is a relative value and as such is measured in decibels (dB). The term "RF Group" refers to the logical container that an instance of RRM is configured through. All devices belonging to a single RF Network will be configured as a member of a particular RF group. The term "RF Group leader" refers to the device where the algorithms for the RF group will be run. The RF group leader is either automatically selected through an election process or may be manually assigned through configuration. The term "RF Neighborhood" refers to a group of APs that belonging to the same RF group. For example, the RF Neighborhood can be a group of APs that can hear each other at ≥–80 dBm. This is a physical grouping based on RF proximity. The term "TPC" or "Transmit Power Control" refers to the RRM algorithm that monitors and manages transmit power level for all APs in the RF group. The term "DCA" or "Dynamic Channel Assignment" refers to the RRM algorithm responsible for selecting the operating channel for all APs in the RF group. The term "CHDM" or "Coverage Hole Detection and Mitigation" refers to the Coverage Hole Detection (CHD) algorithm and the Coverage Hole Mitigation (CHM) algorithm. The term "CM" or "Cost Metric" refers to an RSSI based metric which combines AP load, co-channel interference, adjacent channel interference, and non WiFi sourced interference into a goodness metric, which can be used by the DCA method 808 to evaluate effective channel throughput potential. The term "COF" or "Coverage Overlap Factor" refers to an output of FRA algorithm. For example, the COF can represent a percentage of cells covered to –67 dBm by other 2.4 GHz radios. The term "FRA" or "Flexible radio Assignment" refers to an RRM algorithm that manages flexible radios and determines coverage redundancy and best roles for Flexible Radios to play based on coverage requirements and density.

The RF grouping 816 method is used as the basis for the administrative management domain and the physical management domain within the RF Network. Regarding the administrative domain, proper function of the RRM is based on knowing which APs and controllers are under administrative control for each part of the network. For example, the RF Group name can be an ascii string that all controllers and APs within the group will share. Regarding the physical RF domain, the RRM calculates channel plans and power settings based on an awareness of the RF Location of the APs within the network. For example, neighbor messaging can use the RF Group Name in a special broadcast message that allows the APs in the RF group to identify one another and to measure their RF Proximity. This information can then be used to form RF Neighborhoods within the RF Group (i.e., a group of APs that belong to the same RF Group that can physically hear one another's neighbor messages above –80 dBm, for example). Each RF Group has at least one RF Group Leader per band. The RF Group Leader can be the physical device responsible for: (i) configuration; (ii) running the active algorithms; and (iii) collecting and storing RF-group data and metrics.

In certain non-limiting examples, the Neighbor Discovery Protocol (NDP) is performed by sending an NDP packet from every AP/Radio/Channel every 60 seconds or less. The NDP packet is a special broadcast message that APs all listen for and it allows us to understand how every radio on every channel hears every other radio. It also gives us the actual RF path loss between APs. When an AP hears an NDP message, the AP validates whether the message is from a member of its RF Group. If the NDP message is valid. The AP forwards the message along with the received channel and RSSI to the controller. The forwarded message is added to the neighbor database, which in turn is forwarded to the RF group leader periodically. For each AP, each radio can store up to a predefined number of neighbors ordered by RSSI high to low. Post processing of this information can be used to generate measurements for RX Neighbors (e.g., how the given AP hears other APs) and TX Neighbors (e.g., how other APs hear the given AP).

Regarding the flexible radio assignment 814 method, the FRA uses the outputs from the Neighbor Discovery Protocol to locate each radio in RF distance and evaluate overlapping coverage by cell. Now, the flexible radio assignment 814 method is described according to certain non-limiting examples. First, using the NDP measurements from the APs, FRA plots the x and y coordinates relative to every other AP contained in the solution set (AP Group, physical neighbors). The circumference of each cell is calculated based on the present TX power level of each AP. This produces a logical matrix of the APs' coverage intersections. Based on this understanding, FRA uses a multipoint analysis, to determine the percentage of overlapping coverage for each evaluated AP. The output of this calculation is the COF (Coverage Overlap Factor %). Coverage Overlap Factor is the percentage of the analyzed cell that is covered at −67 dBm or higher by other radios in service. In the process of calculating this coverage, the FRA method 814 keeps track of radios that are coverage contributors to other radios COF, and the FRA method 814 prevents those radios to be marked redundant as long as a radio they are a contributor for is marked redundant.

Once a Radio is marked redundant, the next step depends on the radio configuration. For example there can be two (or more) operational states to which the flexible radio can be assigned: (i) FRA-auto or (ii) manual. When the radios in the "FRA Auto" state, FRA looks to DCA to decide what to do with the now redundant radio(s). DCA's priorities are, first, to try to assign the redundant radio in 5 GHz and increase capacity, but, if the DCA determines that there is already maximum 5 GHz coverage, the radio will be assigned to a monitor role instead.

Regarding the dynamic channel assignments 808 method, the DCA monitors the available channels for the RF group and tracks the changing conditions. The DCA then optimize the RF separation between APs (minimizing co-channel interference) by selecting channels that are physically diverse, which maximizes RF efficiency. According to certain non-limiting examples, the DCA can monitor all available channels and develops the Cost Metric (CM) that will be used to evaluate various channel plan options. The CM can be an RSSI value comprised of interference, noise, a constant (user sensitivity threshold), and load (if enabled). The Cost Metric equates to a weighted SNIR (Signal to Noise Interference Ratio). The Group Leader can maintain the neighbor lists for all APs in the RF Group, and organizes these neighbors into RF Neighborhoods. The DCA can use the following metrics, which can be tracked for each AP in the RF Group: (i) same channel contention (e.g., other APs/clients on the same channel—also known as Co-Channel interference or CCI); (ii) foreign channel—rogue (e.g., other non RF Group APs operating on or overlapping with the AP's served channel); (iii) noise (e.g., sources of interference such as Bluetooth, analog video, or cordless phones); (iv) channel load (e.g., through the use of industry standard QBSS measurements—these metrics are gathered from the Phy layer—very similar to CAC load measurements); and (v) DCA sensitivity (e.g., a sensitivity threshold selectable by the user that applies hysteresis to the evaluation on channel changes). The impact of each of these factors can be combined to form a single RSSI based metric known as the Cost Metric (CM). The CM then represents complex signal to noise and interference ration (SNIR) of a specific channel, which is used to evaluate the throughput potential of one channel over another. The goal is to be able to select the best channel for a given AP/Radio that minimizes interference.

The transmit power control 210 method balances the competing objectives of increasing SNR for the current AP while avoiding co-channel interference with neighboring APs. Since one of the major sources of interference in the network is the signals from other/neighboring APs, the transmit power control 210 method is important for optimal performance. That is, DCA and TPC work hand in hand to manage the RF environment. Transmit power largely determines our cell boundaries. The goal is to maximize the RF coverage in the environment without causing co-channel interference.

According to certain non-limiting examples, TPC uses the TX neighbor and RF Neighbor lists generated by the NDP method. RSSI organized lists built on how reception strength (Rx) from other APs (RX Neighbor) and transmit strength (Tx) to other APs (TX Neighbor), to form a picture of the communication strength among the respective APs within the RF Neighborhood and RF Group. Based on this information TPC sets the transmit power of each AP to maximize the coverage and minimize co-channel interference. TPC will adjust the Tx power up or down to meet the required coverage level indicated by the TPC Threshold. TPC runs on the RF Group leader and is a global algorithm that can be sub configured in RF profiles for groups of APs in an AP group.

Regarding the coverage hole detection and mitigation 812 method, the method can be used to achieve the following objectives: (i) detecting coverage holes, (ii) validating the coverage holes, and (iii) mitigating the coverage holes. That is, CHDM first detects coverage holes and then mitigates them (if possible without creating other problems) by increasing the transmit power and therefore cell area. According to certain non-limiting examples, CHDM can be a local algorithm that runs independent of RRM and the RF Group leader. To facilitate making decisions at a local level, CHDM can run on every controller. That is, each individual controller performs coverage hole detection monitoring all associated APs and thus monitoring every attached client and their received signal levels. Mitigation involves increasing the power on an AP, or group of APs to improve coverage levels to a certain area where client signals fall below a customer selectable threshold.

According to certain non-limiting examples, coverage hole detection can be based on a 5 second (CHD measurement period) histogram of each Clients Received RSSI values maintained by the AP. Values between −90 dBm and −60 dBm are collected in a histogram in 1 dB increments. A client falling below the configured RSSI thresholds for 5 seconds can be marked, e.g., as a pre-coverage hole event.

According to certain non-limiting examples, coverage hole mitigation is a process preformed once the decision to mitigate is made. If a coverage hole exists and it meets certain criteria for mitigation (e.g., a minimum number of clients and a minimum percentage), the AP will increase power by one step. CHDM will then continue to run, and if additional mitigation is called for will re-qualify and power will again be increased by 1 step. This incremental approach can prevent wild and unstable swings in power.

Coverage hole mitigation, while operating independent of RRM's DCA and TPC, can have a significant effect on surrounding APs and the balance of the RF in an environment. Part of the decision to mitigate is based on an evaluation of whether the mitigation could be successful. Increasing the power of a given AP independently of the RF Group metrics is likely to negatively impacting surrounding APs. So mitigation can be applied judiciously. The combination of the new detection metrics and the power limits included in mitigation are applied to make CHDM a stable algorithm.

In addition to the above methods, the memory 806 of the device 802 can also store information for scheduling 818, assignments 820, and information for data collection 822. The data collection 822 can include several types of measurements.

With respect to data collection 822, the RRM processes collected data, which is then used in the organization of RRM as well as for processing channel and power selections for the connected APs. Now, a discussion is provided for how and where to configure monitoring tasks, and how the collected data relates to an operational environment.

Channel scanning, such as passive channel scanning, can be performed on all channels supported by the selected radio. Additionally or alternatively, channel scanning can be performed on a set of channels (i.e., the channel set) defined by the DCA method, which can include all of the non-overlapping channels. The channel set can be modified in accordance with user inputs, for example. Additionally, a passive dwell lasting a predefined duration (e.g., 50 msec.) can be used to detect Rogues, and collect noise and interference metrics. Also, a Neighbor Discovery Protocol Transmission (TX) can be used to send the NDP message from all channels defined to be part of a monitor set.

Figure 9A:
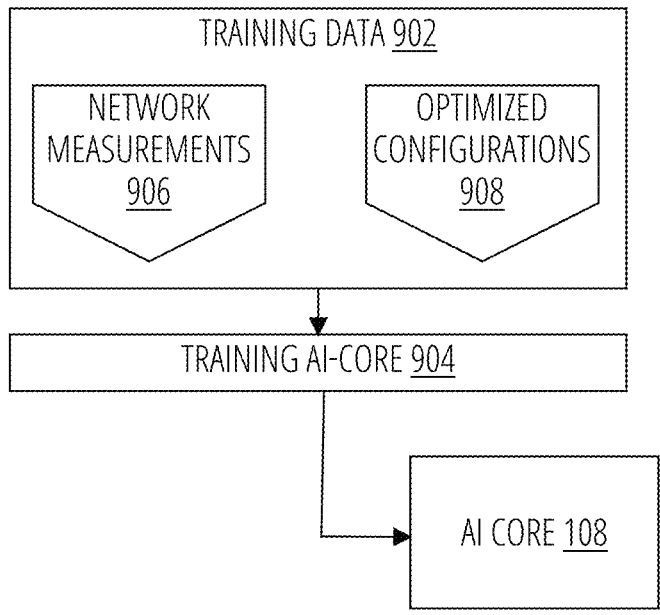
FIG. 9A illustrates a flow diagram of an example of training an artificial intelligence (AI) core, in accordance with some embodiments.

FIG. 9A illustrates an example of training the AI Core 108. In block 904, training data 902 is applied to training the AI Core 108. For example, the AI Core 108 can be an artificial neural network (ANN) that is trained via supervised learning using a backpropagation technique to train the weighting parameters between nodes within respective layers of the ANN. In supervised learning, a set of training data 902 is obtained, and the network is iteratively updated to reduce an error/loss function. The value of the error/loss function decreases as the AI Core 108 outputs configurations that increasingly approximate the optimized configurations 908. In other words, ANN infers the mapping implied by the training data, and the error/loss function produces an error value related to the mismatch between the optimized configurations 908 and the output from the AI Core 108 that is produced by applying the network measurements 906 to the AI Core 108. For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden- Fletcher-Goldfarb-Shannon, one step secant, and Levenberg-Marquardt), or a conjugate gradient method (e.g., Fletcher-Reeves update, Polak-Ribidre update, Powell-Beale restart, and scaled conjugate gradient). Additionally, evolutionary methods, such as gene expression programming, simulated annealing, expectation-maximization, nonparametric methods and particle swarm optimization, can also be used for training the AI Core 108.

The training 904 of the AI Core 108 can also include various techniques to prevent overfitting to the training data 902 and for validating the trained AI Core 108. For example, boot strapping and random sampling of the training data 902 can be used during training.

In addition to supervised learning used to initially train the AI Core 108, the AI Core 108 can be continuously trained while being used by using reinforcement learning based on the network measurements and the corresponding configurations used on the network. The AI Core 108 can be cloud based and can be trained using network measurements and the corresponding configurations from other networks that provide feedback to the cloud.

Further, other machine learning (ML) algorithms can be used for the AI Core 108, and the AI Core 108 is not limited to being an ANN. For example, there are many machine-learning models, and the AI Core 108 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 9B:
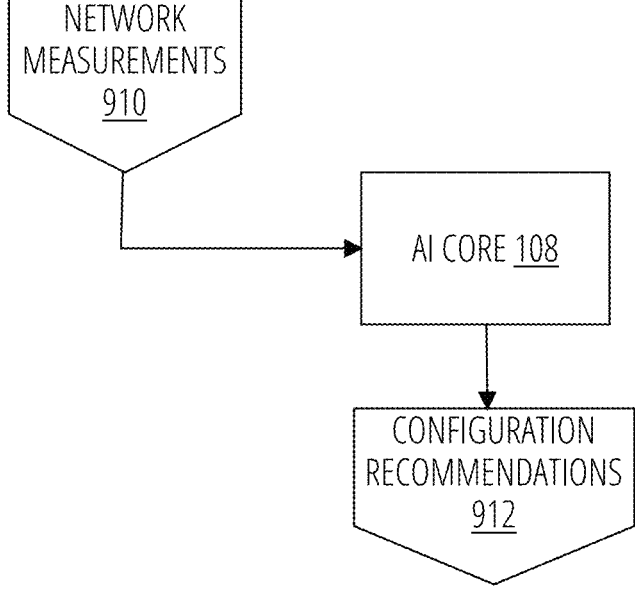
FIG. 9B illustrates a flow diagram of an example of using the AI core, in accordance with some embodiments.

FIG. 9B illustrates an example of using the trained AI Core 108. The actual network measurements are applied to the trained AI Core 108, which then generated configuration recommendations 912. The configuration recommendations will then be provided to a network controller 106, which selectively applies the configuration recommendations in accordance with settings therein. For example the configuration recommendations can be applied a predefined times for certain portions of the wireless network 200. For example, certain configuration recommendations might only be applied when there is a radio reset. Other configuration recommendations might be applied only when there is minimal risk of disrupting service during business hours.

Further, different regions within the wireless network 200 might be scheduled differently.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of determining coverage holes in a wireless network, the method comprising:
   determining an up-link (UL) received signal strength indicator (RSSI) representing a strength of UL signals received at an access point (AP) from one or more user equipments (UEs);
   determining a down-link (DL) RSSI representing a strength of DL signals received at the one or more UEs from the AP; and
   detecting coverage holes in a wireless network based on a comparison of the UL RSSI to a first predetermined threshold and based on another comparison of the DL RSSI to a second predetermined threshold.

2. The method of claim 1, wherein determining the DL RSSI comprises:
   sending, from the AP to a selected UE of the one or more UEs, a beacon report request including a request that the UE report measurements representing a magnitude of a signal received by the UE from the AP;
   receiving, from the selected UE to the AP, the beacon report; and
   determining the DL RSSI of the selected UE based on the received beacon report.

3. The method of claim 1, wherein detecting the coverage holes further includes a two-step process comprising:
   detecting a potential coverage hole based on the UL RSSI being less than the first predetermined threshold; and,
   when the potential coverage hole has been detected, confirming the potential coverage hole is a true coverage hole based on the DL RSSI being less than the second predetermined threshold for one or more UEs that are near an edge of the potential coverage hole.

4. The method of claim 3, wherein determining the DL RSSI comprises:
   identifying one or more UEs that are near an edge of the potential coverage hole as UEs for which the UL RSSI being less than the first predetermined threshold;
   sending, from the AP to the identified one or more UEs near an edge of the potential coverage hole, a beacon request including a request that the identified one or more UEs report measurements representing a magnitude of a signal received by the one or more UEs from the AP;
   receiving, from the one or more UEs to the AP, the beacon report; and
   determining the DL RSSI based on the received beacon report.

5. The method of claim 3, further comprising:
   determining that the potential coverage hole is a false positive based on the DL RSSI being less than the second predetermined threshold.

6. The method of claim 2, wherein
   the beacon report is an 802.11k report that is based on IEEE 802.11k WiFi standard,
   the first predetermined threshold is −80 dB, and
   the second predetermined threshold is −80 dB.

7. The method of claim 1, further comprising:

identifying sticky clients from among the UEs, and excluding the sticky clients from a set of UEs that are used in detecting the coverage holes in the wireless network.

8. The method of claim 7, wherein the sticky clients are identified by:

identifying UEs associated with the AP that correspond to a given RSSI that are less than a third predetermined threshold, the third predetermined threshold being less than or equal to a roaming threshold;

sending a beacon report request to respective UEs of the identified UEs for neighboring APs to the respective UEs; and flagging as a sticky client any UE of the identified UEs for which the given RSSI of one of the neighboring APs is greater than the given RSSI of the AP and for which a quality of service metric for the one of the neighboring AP is comparable or better than for the AP.

9. The method of claim 1, further comprising mitigating the detected coverage holes by:

determining neighboring APs to the coverage hole;

selecting a set of one or more APs from the neighboring APs, the set of one or more APs being selected based on having the set of one or more APs being predicted to have a larger effect on the UL RSSI and the DL RSSI than others of the neighboring APs that are not selected; and increasing a transmit power of APs of the set of one or more APs that have spare operating power budget.

10. The method of claim 9, further comprising:

predicting a magnitude of the effect of respective APs on the UL RSSI and the DL RSSI based on one or more of a flexible radio assignment metric or a coverage overlap factor metric.

11. The method of claim 9, further comprising:

sending a recommendation to change locations of the APs or to add another AP, when none of the neighboring APs has spare operating power budget.

12. The method of claim 1, further comprising:

identifying false negatives for the coverage hole based on the UL RSSI of a first UE being greater than the first predetermined threshold and the DL RSSI of the first UE being less than the second predetermined threshold; and increasing a transmit power of an AP that is near the first UE.

13. The method of claim 1, further comprising:

providing a report indicating, for respective APs in a wireless network, a number of potential coverage holes and how many of the potential coverage holes were confirmed to be true coverage holes.

14. A computing apparatus comprising:

a processor; and a memory storing instructions that, when executed by the processor, configure the apparatus to:

determine an up-link (UL) received signal strength indicator (RSSI) representing a strength of UL signals received at an access point (AP) from one or more user equipments (UEs);

determine a down-link (DL) RSSI representing a strength of DL signals received at the one or more UEs from the AP; and detect coverage holes in a wireless network based on a comparison of the UL RSSI to a first predetermined threshold and based on another comparison of the DL RSSI to a second predetermined threshold.

15. The computing apparatus of claim 14, wherein, when executed by the processor, instructions stored in the memory cause the processor to:

detect a potential coverage hole based on the UL RSSI being less than the first predetermined threshold; and, when the potential coverage hole has been detected, confirm the potential coverage hole is a true coverage hole based on the DL RSSI being less than the second predetermined threshold for one or more UEs that are near an edge of the potential coverage hole.

16. The computing apparatus of claim 15, wherein, when executed by the processor, instructions stored in the memory cause the processor to determine that the potential coverage hole is a false positive based on the DL RSSI being less than the second predetermined threshold.

17. The computing apparatus of claim 14, wherein, when executed by the processor, instructions stored in the memory cause the processor to:

identify sticky clients from among the UEs, and exclude the sticky clients from a set of UEs that are used in detecting the coverage holes in the wireless network.

18. The computing apparatus of claim 14, wherein, when executed by the processor, instructions stored in the memory cause the processor to mitigate the detected coverage holes by:

determining neighboring APs to the coverage hole;

selecting a set of one or more APs from the neighboring APs, the set of one or more APs being selected based on having the set of one or more APs being predicted to have a larger effect on the UL RSSI and the DL RSSI than others of the neighboring APs that are not selected; and increasing a transmit power of APs of the set of one or more APs that have spare operating power budget.

19. The computing apparatus of claim 14, wherein, when executed by the processor, instructions stored in the memory cause the processor to:

identify false negatives for the coverage hole based on the UL RSSI of a first UE being greater than the first predetermined threshold and the DL RSSI of the first UE being less than the second predetermined threshold; and increase a transmit power of an AP that is near the first UE.

20. A non-transitory computer-readable storage medium, the computer-readable storage medium including instructions that when executed by a computer, cause the computer to:

determine an up-link (UL) received signal strength indicator (RSSI) representing a strength of UL signals received at an access point (AP) from one or more user equipments (UEs);

determine a down-link (DL) RSSI representing a strength of DL signals received at the one or more UEs from the AP; and detect coverage holes in a wireless network based on a comparison of the UL RSSI to a first predetermined threshold and based on another comparison of the DL RSSI to a second predetermined threshold.

* * * * *